United States Patent [19]
Payne

[11] Patent Number: 6,080,981
[45] Date of Patent: Jun. 27, 2000

[54] APPARATUS FOR CONTROLLING THE OPERATION OF A DOOR MOVABLE IN A DOOR OPENING TO PREVENT CONTACT BETWEEN THE DOOR AND AN OBSTRUCTION IN THE DOOR OPENING

[75] Inventor: Reginald K. Payne, Maidenhead, United Kingdom

[73] Assignee: Memco House, Berkshire, United Kingdom

[21] Appl. No.: 09/104,697

[22] Filed: Jun. 25, 1998

[30] Foreign Application Priority Data

Jun. 26, 1997 [GB] United Kingdom ............... 9713524

[51] Int. Cl.[7] .................................................. G08B 13/19
[52] U.S. Cl. ............................. 250/221; 340/545
[58] Field of Search ................... 250/221, 341.1, 250/341.6; 340/545, 555, 556, 557; 187/316, 317, 392

[56] References Cited

U.S. PATENT DOCUMENTS

| | | | |
|---|---|---|---|
| 4,717,821 | 1/1988 | Messiou | 250/221 |
| 5,137,118 | 8/1992 | Iwata | 187/103 |

*Primary Examiner*—Que T. Le
*Assistant Examiner*—Kevin Pyo
*Attorney, Agent, or Firm*—Whitman Breed Abbott & Morgan LLP

[57] ABSTRACT

A door obstruction detector employs an optical device, such as a segmented Fresnel lens, and a PIR sensor attached to a moving door, so that the optical device causes an image of an object, in a detection zone, to move across a sensing region of the PIR sensor when the door moves. When the object is sensed in the detection zone, a drive signal is generated for controlling movement of the door. Thermistors can be used to compensate for variation in ambient temperature to adjust detection sensitivity.

16 Claims, 5 Drawing Sheets

APPARATUS FOR CONTROLLING THE OPERATION OF A DOOR MOVABLE IN A DOOR OPENING TO PREVENT CONTACT BETWEEN THE DOOR AND AN OBSTRUCTION IN THE DOOR OPENING

FIELD OF THE INVENTION

This invention relates to door obstruction detector which can be used in a variety of situations where it is necessary to control the movement of at least one door. For example, it may be employed as part of the safety equipment for controlling the movement of a door (or doors) in a lift car. It could also be used in safety equipment for monitoring activity in a revolving door, for example, where customers enter or leave a supermarket by means of large revolving door enabling the use of shopping trolleys.

As the invention is particularly suitable for use with lifts, its use in this field will now be described by way of illustration. However, it will be understood that the invention is not limited to lifts and that it can also be -applied to other moving doors, particularly where it is necessary to monitor a detection zone and to generate a signal for controlling door movement.

BACKGROUND OF THE INVENTION

In the case of lifts, the lift car usually has either a pair of sliding doors which close together, or a single sliding door which closes on a slam post. In either case, the door opening needs to be monitored for obstructions that would prevent door closure. The obstruction may be a human body (or pet), in which case the obstruction detector needs to override the control circuitry for opening and closing the door(s) to prevent injury. The obstruction may also be inanimate, such a patient trolley, hospital bed, shopping trolley, or wheeled pallet, and these objects can become caught in closing doors leading to jamming and damage. In view of these problems, it is common practice to install an obstruction detector in the lift car for monitoring the door opening. The detector is connected to detection circuitry which generates a drive signal in the event of detecting an obstruction, and the drive signal is used for causing door control circuitry to prevent door closure.

Some contemporary lift installations employ a set of infrared diodes for transmitting short wavelength infrared light into a detection zone, and a set of similar diodes for receiving the light either directly or by reflection. With a simple beam interruption system, infrared light transmitter diodes on one side of a door opening transmit light to receiver diodes on the other side of the opening and an obstacle is detected by breaking the beam. These diodes are connected to detection circuitry which responds to beam interruption to generate the drive signal for stopping or reversing door closure. With a reflection system, an obstruction in a detection zone reflects, light onto the receiver diodes and the detection signal generates the drive signal. (This is not a simple case of beam reflection, because the obstruction may have any shape and reflectivity and the transmitter beams are therefore randomly reflected or scattered, and the reflected components which arrive at the receiver diodes have different strengths. This has led to the development of complex circuitry for ensuring reliable operation and for avoiding faulty operation due to stray reflections.)

In some modern beam interruption systems, an array of transmitter diodes are positioned adjacent the closing edge of the lift car door so as to transmit a network of beams of infrared light into the door opening. This provides a so-called "curtain" of light. This "curtain" is present between a pair of sliding doors, when they are open, along the path of sliding door movement. An array of receiver diodes; positioned adjacent the opposite door edge receive the light beams directly from the transmitter diodes and an obstruction is detected when it interrupts the "curtain".

In some modern beam reflection systems, an array of transmitter diodes transmits light into a zone just in front of the door(s) and an array of receiver diodes receive light reflected from, or scattered by the obstruction in this zone. Such systems may be known as infrared "approach" detecting systems.

Both beam interruption and beam reflection systems may be combined for additional safety. In any event, there is the expense of providing the diode arrays and the complex circuitry to enable these arrays to operate effectively.

Neither of these modern systems should be confused with the now obsolete proximity detectors which included capacitance detectors mounted on the edges of sliding doors. These were subject to errors due to the difficulty of reliably balancing capacitances and maintaining the balance. This balancing needed to be carried out initially by skilled operatives at each particular lift location so that the detection circuitry responded only to an obstruction. Moreover, complex detection circuitry was needed for maintaining the balance.

Regardless of the system used, problems can be caused due to the doors closing. Where diodes are set into door edges, the strength of the detection signal Will increase as the doors close, due to the diminishing space between the transmitters and receivers, and hence some form of gain control is necessary to prevent faulty operation. With capacitive sensors, the balance will change as the doors close, due to the capacitances of the doors and/or slam post and compensating circuitry is required to counteract this. Such measures also clearly contribute complexity and expense.

DESCRIPTION OF THE RELATED ART

A lift installation is known from U.S. Pat. No. 5,073,706 in which a passive infrared radiation sensor (PIR) with a lenticular lens is mounted on the wall of a lift lobby for detecting moving people as potential lift passengers. However, the PIR sensor does not sense anything unless the people in the lobby, who generate a thermal signal, are moving. PIR sensors are well known, but they all depend on the fact that a heat generating target must move before it is detected. If the target is stationary, it will not be detected. EP-A-0572926 also shows a sensor, on a lift, for detecting the presence of people in a lobby.

WO-A-82/025360 describes a lift installation in which a set proximity sensors are set into the closing edge of a lift door and connected to a differential amplifier arrangement. However, these sensors are of the capacitance type, which are prone to error and have largely been superseded. The differential amplifier arrangement is used to solve imbalance problems that arise when using this type of sensor. The reference also briefly mentions photocells and ultrasonic sensors, but these suffer from other problems which the invention seeks to avoid.

OBJECTS OF THE INVENTION

The present invention has for its objects to avoid the problems of the prior art, in at least the field of elevator engineering, and to offer a low-cost, reliable and simple alternative without compromising passenger safety.

SUMMARY OF THE INVENTION

The invention achieves these objects by a special adaptation of a passive infrared radiation (PIR) sensor which exploits the movement of the door(s) to its advantage. In particular, a sensing device which includes at least one passive infrared (PIR) sensor, and an optical device for producing an image on a sensing region of the PIR sensor, is attached to the moving door. Then, as the door moves, the optical device causes the image to move across the sensing region of the PIR sensor, thereby causing the PIR sensor to generate a drive signal.

The main requirement of the optical device is that when it views an object and it is moved, it causes an image of the object to move across an image plane, the sensitive region of the PIR sensor being located in this plane. Preferably it comprises a Fresnel lens, but a mirror with a suitable surface could be used instead. In one embodiment of the invention, a segmented Fresnel lens is used to produce multiple images in an image plane (in which the sensitive elements of the PIR sensor are located). With a segmented lens, there is the added advantage of causing multiple images of the object to pass sequentially over the sensitive region. For example, a segmented lens, wherein each segment is a positive Fresnel lens with its optical axis displaced in a vertical direction with respect to the next segment, can be used to scan a sensitive region across the door opening to simulate a "curtain" effect. A lenticular lens could be used to achieve a similar effect.

In another embodiment of the invention, a segmented Fresnel lens is used, in a configuration which may include a mirror, to simulate an "approach" effect (i.e. for detecting the presence of a passenger approaching the lift car). In a further embodiment, a single positive Fresnel lens is used, with a mirror, to simulate a "proximity" effect. (This provides a detection zone.adjacent the leading edge of the door without using obsolete capacitive or touch detectors). The "curtain", "approach" and "proximity" effects can be used either individually, or in any combination (i.e. depending on the requirements of the lift installation and the cost). In a large office block, there would be a need for a rapid lift service, but there would also be a need to ensure passenger safety and the "proximity" and "approach" effects might be used on the lift car. However, in a less busy environment, a "curtain" effect may provide adequate safety and at a more appropriate lower cost.

The "detection zone" can be a narrow space extending fully across the floor of the door aperture when simulating the "curtain" effect. This "curtain" can extend upwardly from the floor, across most or all of the door opening. When simulating a "proximity" effect, the detection zone preferably extends close to the leading edge of the door and it may only cover a small area on the floor (this may be just outside the car door so as to prevent triggering of the door obstruction circuitry when the lift is full and one or more passengers are standing close to the car door). With a pair of sliding doors, the detection zone extends adjacent each leading edge of each car door. (Although this would leave an unmonitored zone between two detection zones, the detection zones would come together when the doors close and any obstacle would be detected by either one PIR or the other, or eventually by the two overlapping zones). In the case of "approach" sensing, the detection zone lies outside the car door(s), e.g. to detect passengers approaching the lift. It could also be inside lift car if it were necessary to detect that the car is empty, e.g. by monitoring the passengers leaving the car.

The field of view or sensing zone of the PIR sensor is preferably limited by using opaque light barriers, such as specially designed enclosures, masks, baffles, adjustable vanes, etc. The design of the lens, which focuses light into specific areas on a focal plane, and the use of other optical devices, such as mirrors, will also modify the field of view.

The "object" is not necessarily a human body (which provides a good thermal image), since it can be, for example, a shopping trolley containing frozen food, which is sensed against a warmer background.

In a preferred embodiment, the invention utilises the self-chopping action of a segmented lens, as caused by the door motion, to permit one or more passive infrared sensing elements to monitor the doorway for the presence of red sources or sinks, and which prevents the door from closing when such signals are detected. At least one long wavelength infra-red radiation sensor (compared to the wavelength of infra-red beam detectors) is used to view the desired detection zone and to respond to the appearance of any warm body in its field of view. Although such body heat detection devices have been available for many years, as the active element in many intruder alarms, these are stationary detectors which rely on the movement of the intruder to generate a detectable signal and they have not been applied to a device which itself moves in order to extract information about its surroundings.

Whilst the invention can be used effectively, in most cases, for thermally sensing a warm object against a relatively colder background, the PIR sensor is susceptible to variations in the natural background of infra-red radiation and this is likely to be observed as a loss of effective range when the ambient temperature approaches 37° C., since the human body is at a similar temperature and its "contrast" with the background will be greatly reduced. A similar, but opposite effect, can be seen at very low ambient temperatures when the range of the detector becomes so great that it is triggered by unwanted minor variations in the overall background.

This problem is solved, in a preferred embodiment of the invention, by including gain control means for increasing detection sensitivity when the ambient temperature increases and the difference between the temperature of the object and the ambient decreases, and for decreasing detection sensitivity when this difference increases. For example, the gain control means may be a gain controller in the circuitry for generating the drive signal and it can include one or more "thermistors" which are arranged to increase detection sensitivity a high ambient temperatures, and decrease it at low temperatures. Careful optimisation of the thermal gain control will thereby greatly reduce the effects of ambient temperature fluctuations.

As explained above, PIR sensors can be used in various combinations to simulate "curtain", "approach" and "proximity" effects. However, further advantages can be achieved by combining the thermal sensing by the present invention with more conventional sensing techniques (which are not dependent on detecting thermal objects against a colder or warmer background).

In an embodiment of the invention, auxiliary sensing means are included having circuitry for sensing an object in the detection zone and for generating a drive signal for controlling door movement, the auxiliary sensing means being of a kind which senses an object other than thermally, such as by intercepting or reflecting infra-red beams, or by generating capacitive changes, so that the object is detected by at least one sensing means or the other. Such a combined system can have improved reliability and immunity to "false triggers". It can also make some less satisfactory conventional techniques more viable. For example, the invention may be combined with a transmissive infra-red curtain, in order to give increased curtain "density" and an improvement in detection on each of the curtain zone. Alternatively, the invention can be used with a "capacitive proximity edge" detector to give a "curtain" zone ahead of the short range capacitive sensor.

The circuitry which provides a drive signal in response to the signal generated by the thermal sensing means, (the drive signal being used to control the movement of the door and its ancillary equipment), is of well known construction and therefore requires no further description. Those skilled in the art will understand that the signal generated by the sensing means, either as a result of thermally sensing an object, or not, such as by intercepting an infra-red beam, or by receiving reflected infrared radiation, or by responding to capacitive change, is an input signal which can be suitably processed and utilised for triggering conventional circuitry so that it provides a drive signal for door control. However, with thermal sensors gain adjustment can be used, as noted above, to compensate for changes in the differential temperature between a thermal object and its background.

BRIEF DESCRIPTION OF THE DRAWINGS

Preferred embodiments of the invention will now be described with reference to the accompanying drawings, in which.

DETAILED DESCRIPTION OF THE INVENTION

In the following description, it will be understood that a sensor is attached to either a single door (and possibly a slam post), or to one or both doors of a pair of doors. Only one door is described to facilitate explanation.

Figures 1, 2:
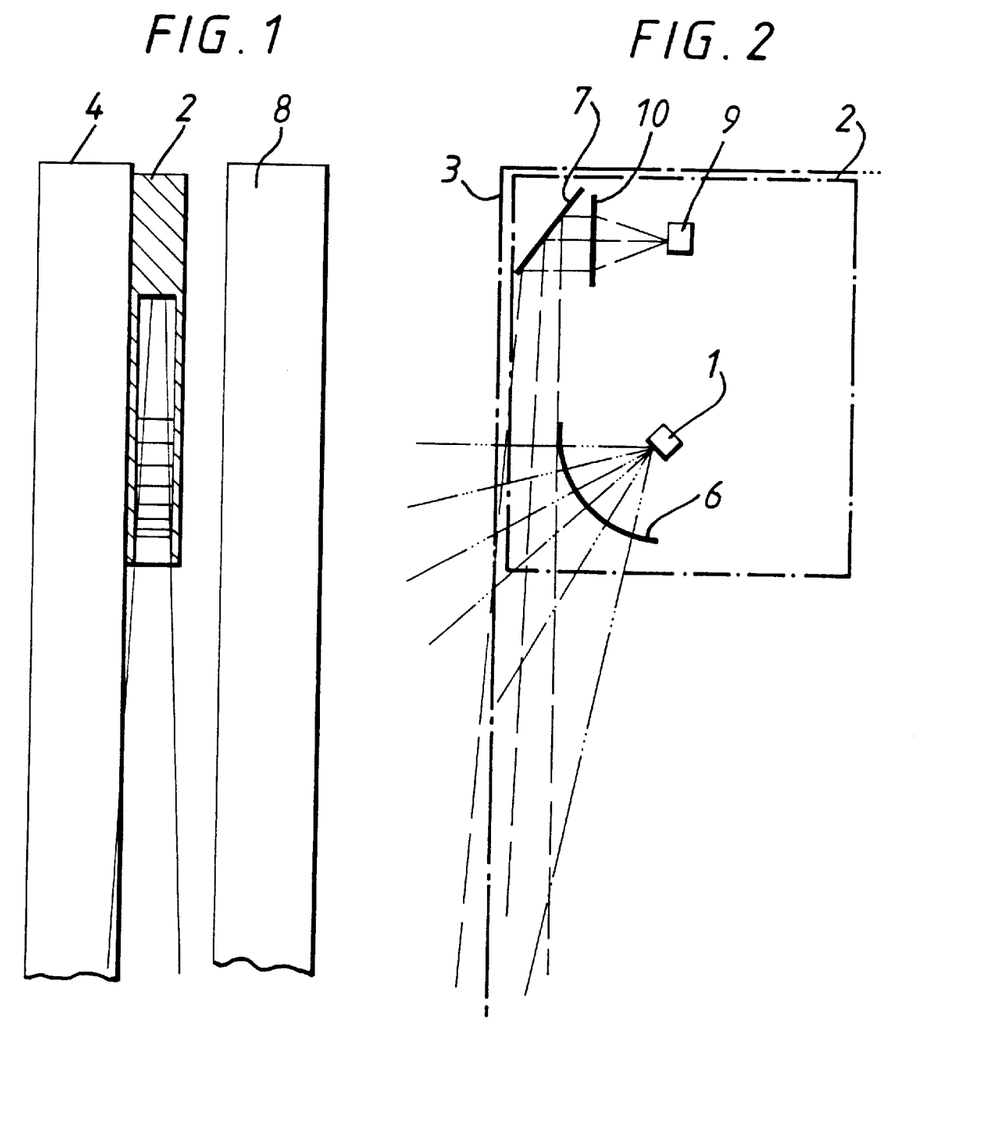
FIG. 1 is a side elevation of part of a lift car fitted with two sensors according to an embodiment of the invention; one for providing a "curtain" effect (looking across the door opening) and the other for providing a "proximity" effect (looking along the leading edge of the door)
FIG. 2 is a view at right angles to the view in FIG. 1, showing the fields of view of each sensor.
Figure 3:
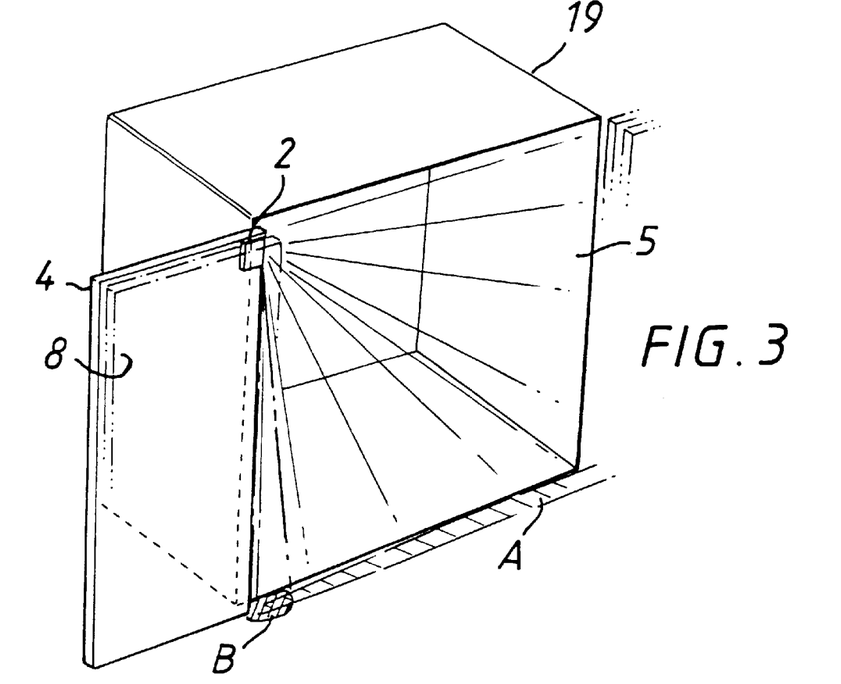
FIG. 3 is a perspective view of the lift car having the sensor shown in FIGS. 1 and 2.

FIGS. 1–3 illustrate an embodiment of the invention in which "curtain" and "proximity" modes of operation are combined. A "curtain" PIR (Passive Infra-Red) sensing means includes a dual sensing element 1 and a segmented Fresnel lens 6 (in the form of a curved band) positioned in a shielded enclosure 2. (This arrangement is described in more detail below with respect to FIG. 5.) The enclosure 2 is preferably located close to the top of the leading edge 3 of a lift car door 4 so that the sensing zone is a narrow area A on the floor of the door opening 5. The sensing zone includes a region above area A, which is encompassed by the door opening 5 (i.e. normally covered by a light "curtain"). The area A preferably extends as a narrow strip across the door opening and it may extend just outside the door opening so as to prevent accidental triggering of the door obstruction circuitry when the lift is full and passengers are standing close to the door.

Mounted in the same enclosure is a "proximity" PIR (Passive Infra-Red) sensing means which includes a dual sensing element 9, a Fresnel lens 10 and a mirror 7 (described in more detail below with respect to FIG. 5). Its sensing zone extends alongside the leading edges of the doors 4 and 8, and covers a small area B on the floor close to the door edge. In the "proximity" mode of operation, an obstruction is detected in the narrow sensing zone close to the door edge (rather than across the entire door opening).

Figure 5:
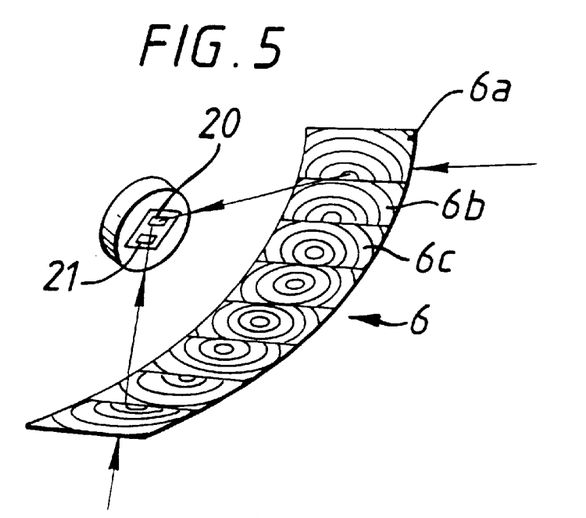
FIGS. 5–7 respectively illustrate, in more detail, embodiments of the invention which are used to simulate "curtain", "proximity", and "approach" modes of operation.

Referring to FIG. 5, this show the "curtain" PIR sensing means in more detail. This includes a curved segmented Fresnel lens 6, having a series of segments 6a, 6b, 6c, . . . , wherein each segment is a positive Fresnel lens with its optical axis displaced in a vertical direction with respect to the next segment. This enables multiple superimposed images of the field of view, with small positional offsets, to fall upon the dual sensor element(s) 20, 21. The enclosure 2 (FIGS. 1 and 2) is of narrow construction, with a slot-shaped viewing aperture having its long dimension in the vertical plane and parallel to the door edges. With the sensing elements 20, 21 mounted deep inside this cavity, the field of view, in the horizontal plane, will be strictly limited and will be confined to a narrow region across the door closing zone to simulates a "curtain" sensing zone.

Figure 6:
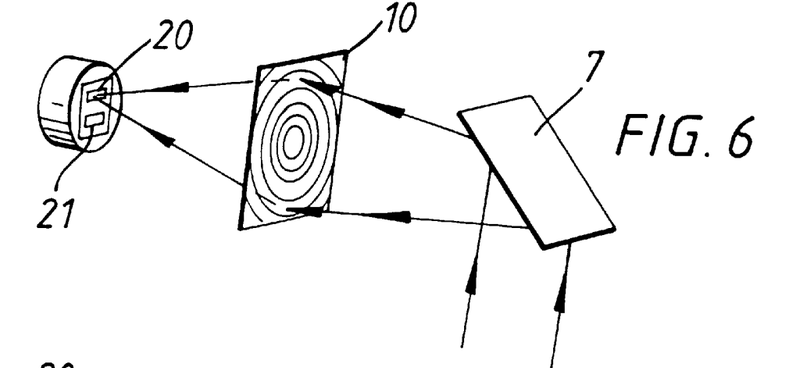

FIG. 6 shows the "proximity" mode sensor in more detail. A single Fresnel lens 10 and a copper mirror 7 provide a field of view (or sensing zone) closely adjacent the leading edge of the car door (as shown in FIG. 3). The "footprint" of this field of view is a small narrow zone B on the landing floor just outside the lift doors. With a pair of sliding doors, these sensing zones are adjacent the respective leading edges of the car doors.

The "curtain" sensing function could be combined with the "proximity" sensing function by using one PIR sensing means and suitable optics and circuitry.

Figure 4:
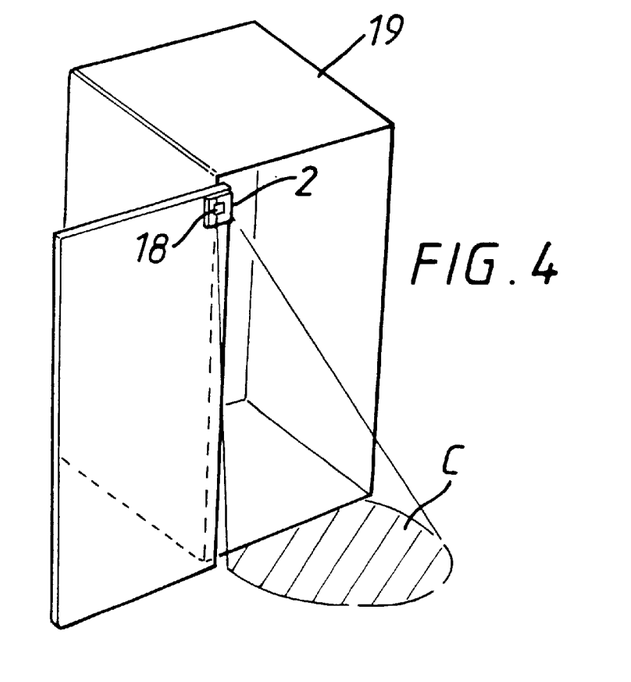
FIG. 4 is a perspective view of a lift car fitted with a sensor for an "approach" mode of operation.
Figure 7:
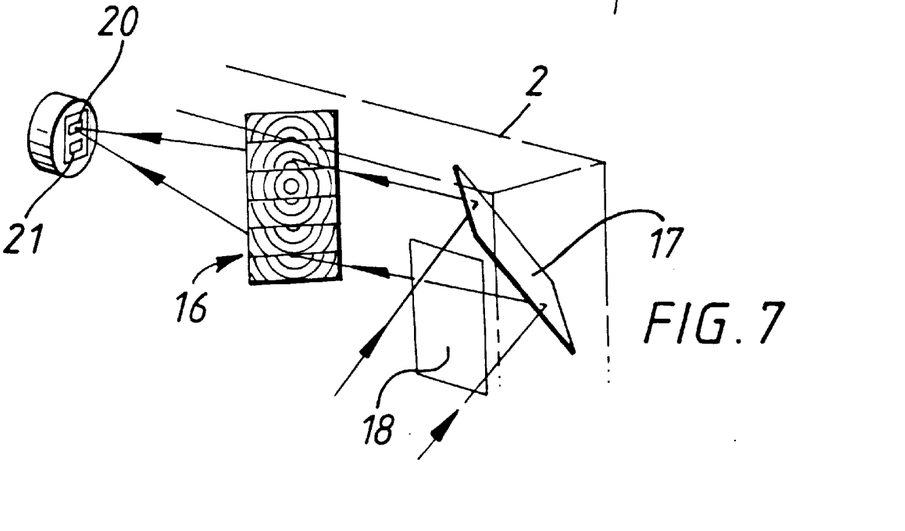

FIGS. 4 and 7, illustrate an embodiment which has an "approach" mode of operation. This includes a straight section of a segmented Fresnel lens 16 and angled copper mirror 17 to provide a field of view through an aperture 18 in a side wall of an enclosure 2 (similar to that shown in FIGS. 1 and 2). The enclosure is attached to the car door so as to provide a sensing zone in front of the door opening of the lift car 19.

A moving thermal object will be sensed in this zone on approaching the lift car 19. This arrangement has found to be surprisingly sensitive and it can sense an object which is, for example, some 3 meters from the door threshold. The asymmetrical nature of the sensitivity of the PIR sensing means makes it especially sensitive to warm objects which move towards or away from the doors and it can be used to enhance the "curtain" and/or "proximity" effects in order to hold the doors open for a passenger attempting to enter the lift at the last moment. It is arranged to view the region immediately outside the doorway, i.e the area C on the landing floor and a region immediately above this area. This "approach" sensing means also has a dual sensing element 9. The mirror 7 directs the field of view downwardly to sense thermal targets just outside the doors. The "approach" sensing function could and either the "curtain", or "proximity" sensing functions could use one PIR sensing means with suitable optics and circuitry.

It is preferred to use a dual sensor element 1 (which can be of known construction) in which the image or images pass first over one element 20 and then over the next 21. The elements have oppositely poled responses whereby the resultant output, which appears like a sine wave, is effectively doubled. The preferred segmented lens 6 produces multiple images of the object and these are caused to move sequentially over the sensor elements 20, 21 as the door 4 moves. In the lift car, the segmentation of the lens is preferably in the vertical plane so that the motion of the door (and hence the PIR sensor) will cause these images to travel across the sensor elements in the vertical plane. If an object, with a temperature differential with respect to its surroundings, is in the field of view when the door 4 starts to move, the heat images of the object will travel across the sensor(s) 1 in rapid succession and will cause an alternating signal to appear at the sensor output. This signal may then be processed, by circuitry not shown but which can be of known construction, so as to provide a drive signal which causes door control circuitry (not shown, but of known construction) to stop, or to reverse the car doors 4. The landing doors 8, which are also shown in the drawings, will move together with the car doors, as will be known to those skilled in the art.

Although the PIR sensing means is designed to detect warm objects viewed against a cold background, it is also capable of detecting objects which are cooler than their surroundings. This enables it to see shopping trolleys containing cold food items from a refrigerator, or other objects which have been transported from cooler areas.

In many cases, it is desirable to restrict the sensitive zone of detection of "curtain" sensing means to a narrow region just in front of the leading edge of each door. This gives a "proximity" action, which will cause the doors to re-open only when the person entering is close to the door edge. This is useful where the fastest possible floor to floor service is required, as the doors will usually continue to close, even when passengers are still moving in and out, so long as no-one passes too close to the door edge.

If the lens aperture slot is long, the sensitive zone covered by the detector will extend all the way across the door aperture and effectively fill the entire area of the entrance. It will therefore be impossible to enter the lift without triggering the door to reverse and the behaviour will be similar to that of an infra-red curtain.

The "proximity" action with the "curtain" sensing means can be easily achieved by incorporating an adjustable barrier into the optical system so that the field of view can be varied to give the desired performance. This is preferably implemented by the addition of a curved vane which rotates in front of the Fresnel lens and can be locked into any desired position.

In another implementation, two PIR sensors may be used to view the region ahead of the lift doors and achieve both the "curtain" and "proximity" actions. One of the sensors is allocated a wide field of view in the vertical plane and the other a narrow field of view, close to the plane of the door edge. The wide field sensor then provides a "curtain" detection function, which covers the entire door aperture, while the narrow field sensor gives a "proximity" detection function. In this implementation, the two modes are independently adjustable and either may be completely disabled if only one particular mode is desired. The field of view of the proximity sensor must be capable of being adjusted to set the proximity range which is required, and so the use of a pivoted mirror immediately in front of the sensor, is beneficial. This mirror can be adjusted and then locked in place so that the detection range ahead of the door edge is pre-set to a satisfactory value.

Because the sensors are not sensitive to bodies at ambient temperature, the detector may be unsuitable for an environment where trolleys or palettes etc. are commonly used. To overcome this objection, it is possible to combine the PIR head with a low cost capacitive or infra-red beam device to enhance its performance on such obstructions.

There are some environments where the detection of a human body is required within a large but well defined zone, and where other detection means are difficult to implement. This is the case where very large powered rotary doors are used at the entrances of supermarkets etc. The need here is to stop the door leaves from catching up with a slow moving person within the door rotation zone and so colliding with them and possibly causing injury.

Figure 8:
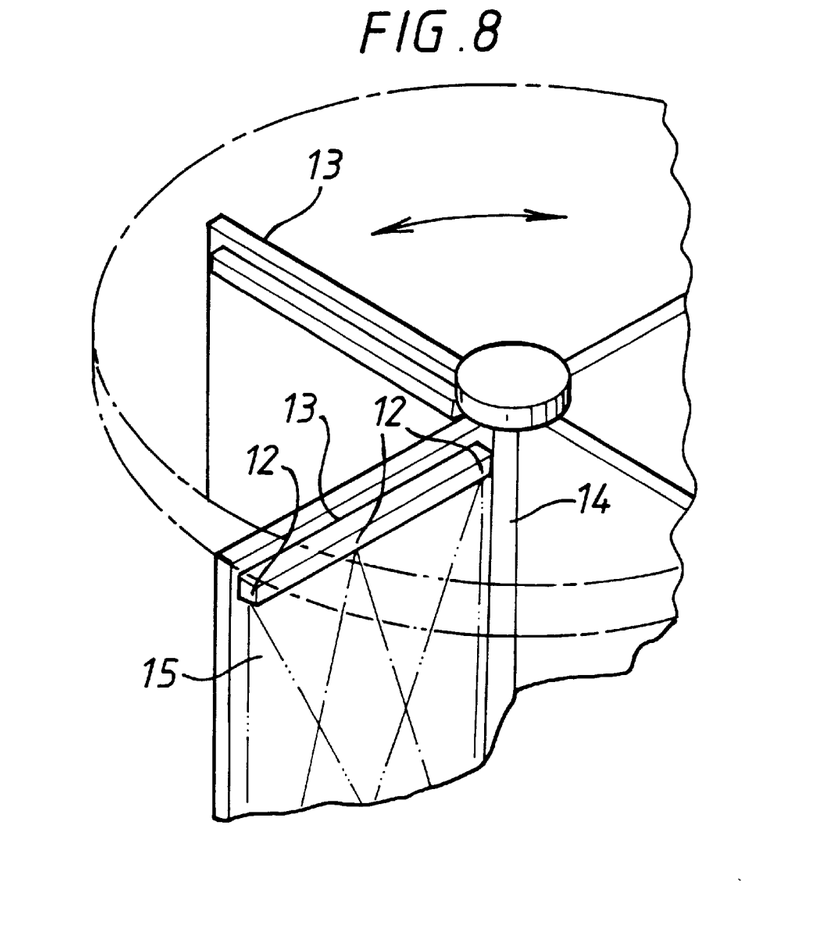
FIG. 8 illustrates another embodiment, which is fitted to a revolving door, and the inset view

A variation of the PIR unit described above is shown in FIG. 8, in which a multiplicity of PIR sensors 12 are arranged along the top edge of each door leaf 13 (or facing out from the central hub 14, not illustrated) of a revolving door. These sensors are arranged so as to be sensitive in a series of narrow overlapping "fans" 14 positioned just ahead of the door leaf.

Figure 8A:
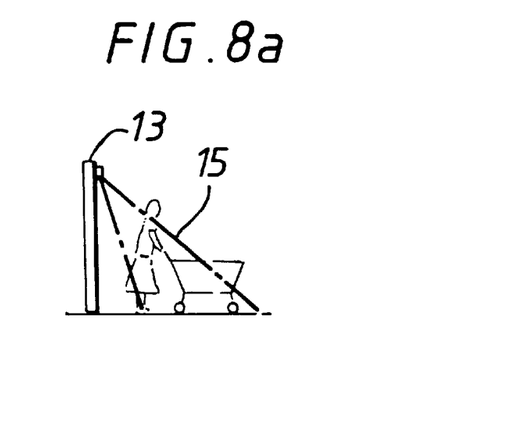
FIG. 8a shows a detail of operation.

If a human body enters this zone at any point, as shown in FIG. 8a, the sensor(s) will register a sudden increase of signal and this can be used to stop, or slow, the doors. For example, a drive signal is generated which controls the shaft speed of a drive motor for the rotating door. The glass panels of such doors are opaque to the long-wave infra-red radiation that is detected by the sensors, and so the door panels define the sensitive zone very precisely and the false detection of persons behind the door, or outside the outer wall, is not possible.

Alternatively, the door may revolve normally at a given constant speed. When a person walks at the same speed as the door rotates (keeping pace with the door), the sensor does not respond. However it will respond to a person stopping, or falling over, or moving slowly, due to the larger difference in relative motion.

The invention may be used in combination with other known forms of sensors to suit the particular application. This would then provide a system with improved sensing of all forms of obstruction and greater overall reliability. For example, the PIR sensor in a lift car would not respond to a trolley against a background of similar inanimate material, all at the same ambient temperature. Therefore, an auxiliary detector, preferably an active infra-red beam device, or a mechanical edge or capacitive device, could be included where appropriate. Also, the system can incorporate devices and circuitry to sense the detector environment and to self-adjust the performance of the PIR sensors (and any other sensors) to suit the operating conditions. This may preferably be done by using a micro controller to record the signals received during several unobstructed test runs and to use this information to characterise the ambient signals expected in normal operation.

Figure 2A:
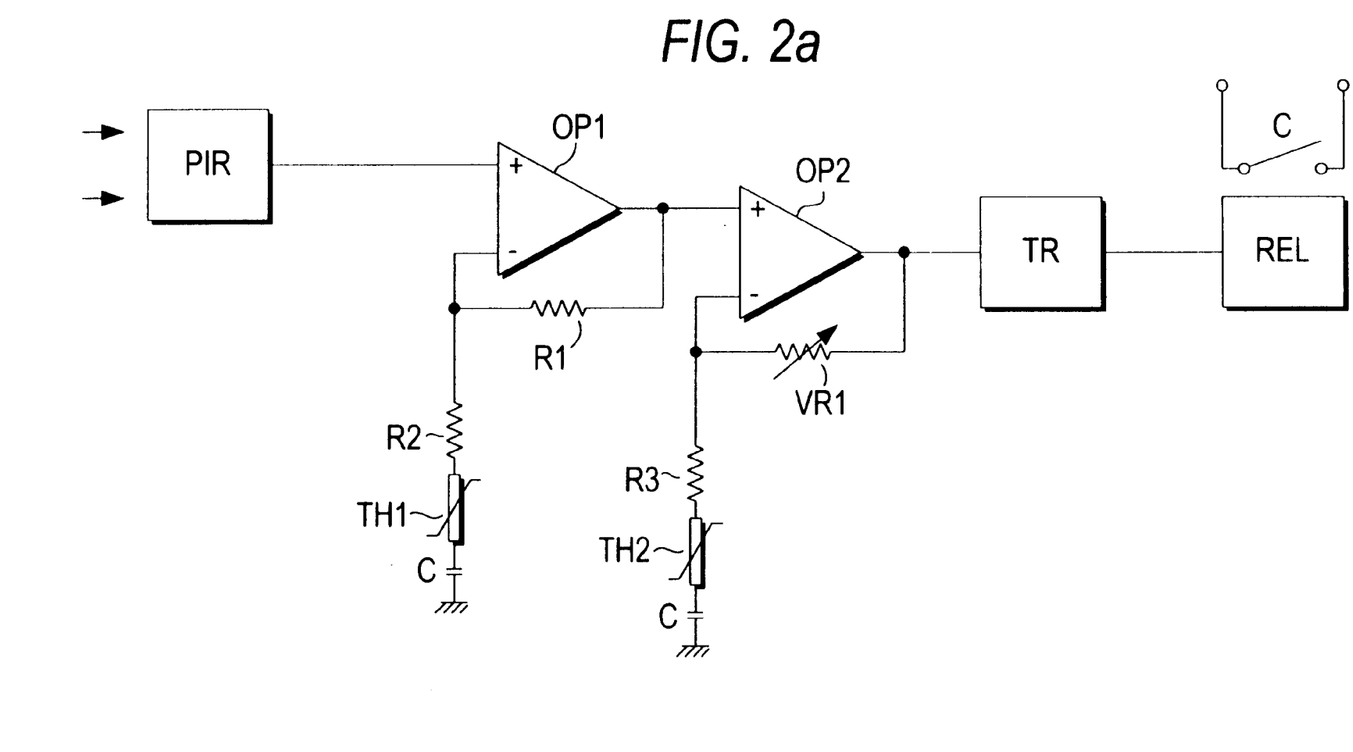
FIG. 2a is a schematic block diagram showing the sensing means connected to circuitry which includes (optional) gain control for adjusting sensitivity due to changes in ambient temperature of the background.

FIG. 2a shows a schematic block diagram with an optional modification or improvement for compensating for variations in ambient temperature. For example, where the object to be detected is the human body, having a temperature of 37° C., the sensitivity of detection will be reduced as the relative temperature of the background increases. Likewise, the sensitivity of detection will increase at low ambient temperatures. FIG. 2a shows the use of gain control means, incorporating one or more thermistors, which increases gain with increasing ambient temperature and decreases gain with decreasing ambient temperature. Therefore, the circuitry has high gain when the temperature difference between the object and background is small, so as to improve the sensitivity of detection. However, where there is a large temperature difference, gain will be reduced so as to avoid triggering by unwanted minor variations in the overall background.

Regarding FIG. 2a, the PIR sensor (on the door) responds to the thermal target, due to relative door movement, and outputs a signal to OP.AMPS OP1, OP2. The gain of the circuit is set by the ratios R1:R2+TH1 and VR1:R3+TH2, where R1, R2, R3 are resistors, TH1 and TH2 are thermistors with resistive values, and VR1 is a variable resistor suitably adjusted for the circuit. By using a negative temperature co-efficient thermistor for each of the positions TH1 and TH2, a degree of thermal gain control is possible. The resistance of TH1 and TH2 falls with rising temperature, so the latter ratios increase and the circuit gain rises in proportion. The ratio of R2:TH1 and R3:TH2 can be varied to alter the relative degree of temperature compensation required. The output of OP2 is supplied to Trigger Circuit (TR) which energises. Relay (REL) having contacts (C) in series with an electrical motor (not shown) that drives the door(s) (not shown) of a lift (not shown). An OP.AMP, either with or without standard gain control, may replace the OP.AMPS OP1,OP2 if no temperature compensation is required.

What is claimed is:

1. Apparatus for controlling the operation of a door movable in a door opening, a detection zone being present adjacent said door opening, said door operation being controlled so as to prevent contact between said door and an obstruction in said door opening, the apparatus comprising:

a sensing device attached to said movable door for thermally sensing said object in said detection zone, said sensing device including at least one passive infrared PIR sensor having a sensing region, and an optical device for producing an image on said sensing region, whereby when said door moves in said door opening, said optical device causes said image to move across said sensing region of said PIR sensor, thereby enabling said sensing device to sense said object and to generate a drive signal; and circuitry response to said drive signal for controlling the movement of said door to prevent contact between said door and said obstruction.

2. Apparatus according to claim 1, wherein said optical device comprises a lens or mirror.

3. Apparatus according to claim 2, wherein said lens is a segmented Fresnel lens or a lenticular lens for producing multiple images of said object which are caused to move across said sensing region when said door moves.

4. Apparatus according to claim 3, wherein said sensing device further includes walls defining an enclosure having an aperture, said sensing device being mounted on said door so that said aperture provides said optical device with a field of view which is confined to a limited region, said limited region being within said detection zone, whereby the motion of said door causes images of objects only in said limited region to travel across said sensing region of said PIR sensor.

5. Apparatus according to claim 4, wherein said door is an elevator car door.

6. Apparatus according to claim 5, wherein said sensing device is attached to a leading edge of said car door.

7. Apparatus according to claim 5, wherein said sensing device is attached to a top portion of said car door.

8. Apparatus according to claim 5, wherein said limited zone extends across said car door opening.

9. Apparatus according to claim 5, wherein said limited zone extends alongside a closing path of said car door.

10. Apparatus according to claim 5, wherein said limited zone is outside said car door opening.

11. Apparatus according to claim 1, wherein said sensing device includes opaque barriers for limiting the field of view of said optical device.

12. Apparatus according to claim 1, wherein said door is a revolving door having radial leaves and within one or more PIR sensors are attached to a respective one of said radial leaves, each of said PIR sensors having a field of view between said leaves and said drive signal being generated for controlling rotation of said revolving door.

13. Apparatus according to claim 1, wherein ambient temperature within said detection zone can vary and further including gain control circuitry for increasing detection sensitivity when said ambient temperature increases and a difference between a temperature of said object and said ambient decreases, and for decreasing detection sensitivity when said difference increases.

14. Apparatus according to claim 13, wherein said gain control circuitry is part of said circuitry responsive to said drive signal.

15. Apparatus according to claim 13, wherein said gain control circuitry includes a thermistor responsive to changes in ambient temperature in order to adjust said gain.

16. Apparatus according to claim 13 further including auxiliary sensing means for sensing an object in said detection zone, said auxiliary sensing means sensing said object by intercepting or reflecting infrared beams of radiation, or by generating capacitive changes, so that said object can be detected by said auxiliary sensing means if said object is not detected by said sensing device for thermally sensing said object in said detection zone.

* * * * *